UNITED STATES PATENT OFFICE.

HILLERY O. OWEN, OF CORPUS CHRISTI, TEXAS.

WEED-KILLING COMPOSITION.

1,039,317. Specification of Letters Patent. Patented Sept. 24, 1912.

No Drawing. Application filed March 1, 1912. Serial No. 680,985.

*To all whom it may concern:*

Be it known that I, HILLERY O. OWEN, a citizen of the United States, residing at Corpus Christi, in the county of Nueces and State of Texas, have invented new and useful Improvements in Weed-Killing Compositions, of which the following is a specification.

This invention relates to a new and useful composition of matter designed for killing and preventing the growth of weeds and noxious grasses, and is particularly designed for killing and preventing the growth of Bermuda and Johnson grasses.

The object of the invention is to provide a composition of this character which is inexpensive of production and use, which in the proportions employed is harmless to human beings and farm stock, and which, while thoroughly efficient in action, will permit of the use of the land for cultivation and production of crops within a minimum period after the destruction of the grass or weeds.

My improved grass or weed destroying composition consists of the following ingredients in the proportions stated, to wit: white arsenic ($As_2O_3$,) 2 lbs. or 32 parts; sal soda, *i. e.*, carbonate of sodium, ($Na_2CO_3$,) 1 lb. or 16 parts; and ammonia water, 1 oz. or 1 part.

The ingredients above mentioned are placed in a suitable vessel and water in sufficient quantity added to dissolve the same, the mixture being preferably boiled or heated and agitated until the solid constituents are thoroughly dissolved in the vehicle formed by the plain water and ammonia water. This mixture is then combined with 40 gallons, more or less, of plain water according to the active strength desired.

In using the composition, it is sprinkled or spread over the grasses or weeds to be destroyed, and in the course of a few days will effect their destruction and prevent further growth of such weeds or grasses in the vicinity for a long period. Owing to the fact that the poisonous ingredients of the mixture are combined in small proportions according to the volume of the composition used, the composition may be employed without danger to human life or farm stock.

Land ridden with grasses of the character described and other noxious weeds and grasses may be freed therefrom and rendered available for cultivation within a minimum period and by the use of a comparatively small quantity of the composition per acre.

The carbonate of sodium employed serves as a solvent of the chief ingredient arsenious oxid, increasing its solubility and stability in solution, which action is further promoted and increased by the ammonia water.

I have found by practical demonstration and use that this composition is superior to all others of similar character employing arsenic, carbonate of sodium and ammonium salts, such as ammonium chlorid, as the form of ammonia employed by me acts in some manner to limit the stability of the composition when in the soil and exposed to the atmosphere, the composition being rendered completely innocuous and ineffective within a period of about thirty days, so that within this period after the destruction of the grasses or weeds the soil may be cultivated and planted without liability of injury to the deposited seeds. Where ammonium chlorid or other similar salts are employed, the composition is maintained in an active state for a period of many months, so that the land cannot be cultivated. My improved composition overcomes this objection, a matter of great importance to those holding limited acreage and where grasses and weeds of the character stated have a tendency to grow.

Having thus described the invention, what I claim as new is:—

1. A grass and weed destroying composition comprising an aqueous solution of arsenious oxid, sodium carbonate and ammonia.

2. A grass and weed destroying composition comprising an aqueous solution of arsenious oxid, 32 parts, carbonate of sodium, 16 parts and ammonia, 1 part.

In testimony whereof I affix my signature in presence of two witnesses.

HILLERY O. OWEN.

Witnesses:
F. P. STARK,
F. J. ONZON.